United States Patent [19]

Arai et al.

[11] Patent Number: 4,628,690
[45] Date of Patent: Dec. 16, 1986

[54] FLUID CIRCUIT FOR OPERATING A BIDIRECTIONAL HYDRAULIC MOTOR WITH A REDUCED SHOCK

[75] Inventors: Mitsuru Arai, Kamakura; Hideyori Sato, Funabashi; Shoichiro Inatomi, Yokohama, all of Japan

[73] Assignee: Kabushiki Kaisha Komatsu Seisakusho, Tokyo, Japan

[21] Appl. No.: 645,730

[22] Filed: Aug. 30, 1984

[30] Foreign Application Priority Data

Aug. 31, 1983 [JP] Japan .......................... 58-133521[U]

[51] Int. Cl.⁴ ........................................... F16D 31/02
[52] U.S. Cl. ...................................... 60/464; 60/468; 60/494
[58] Field of Search .................. 60/464, 468, 494; 91/449

[56] References Cited

U.S. PATENT DOCUMENTS

| | | | |
|---|---|---|---|
| 3,636,708 | 1/1972 | Karmon et al. | 60/464 |
| 3,945,457 | 3/1976 | Olsen | 60/468 |
| 3,948,146 | 4/1976 | Mauer et al. | 60/468 |
| 4,202,175 | 5/1980 | Hale et al. | 60/494 |
| 4,212,229 | 7/1980 | Johnson | 60/494 |
| 4,362,018 | 12/1982 | Torii | 60/468 |
| 4,520,625 | 6/1985 | Sato et al. | 60/464 |

*Primary Examiner*—A. Michael Chambers
*Attorney, Agent, or Firm*—Armstrong, Nikaido, Marmelstein & Kubovcik

[57] ABSTRACT

A hydraulic circuit is disclosed for driving a bidirectional hydraulic motor from a pump via a hand operated directional control valve, as for propelling an earthmover or actuating an implement assembly thereon. For mitigating an abrupt pressure rise as when the motor is set into or out of rotation, the circuit has a pair of oppositely directed dual pressure relief valves connected in parallel with each other between a pair of main lines extending between motor and directional control valve. Each dual pressure relief valve is normally conditioned to pass at a predetermined lower pressure the pressurized fluid from one of the main lines and to pass at a predetermined higher pressure the pressurized fluid from the other main line. When pilot operated from a timing valve responsive to a pressure differential between the main lines, that one of the relief valves which has been bleeding off the pressurized fluid at the low pressure is closed, with the result that the pressurized fluid is then released at the high pressure through the other relief valve, thereby causing two stepwise pressure rises for the reduction of a shock. The invention proposes the provision of a variable resistor between the timing valve and each main line for variably delaying the pilot actuation of the relief valves by the timing valve.

1 Claim, 2 Drawing Figures

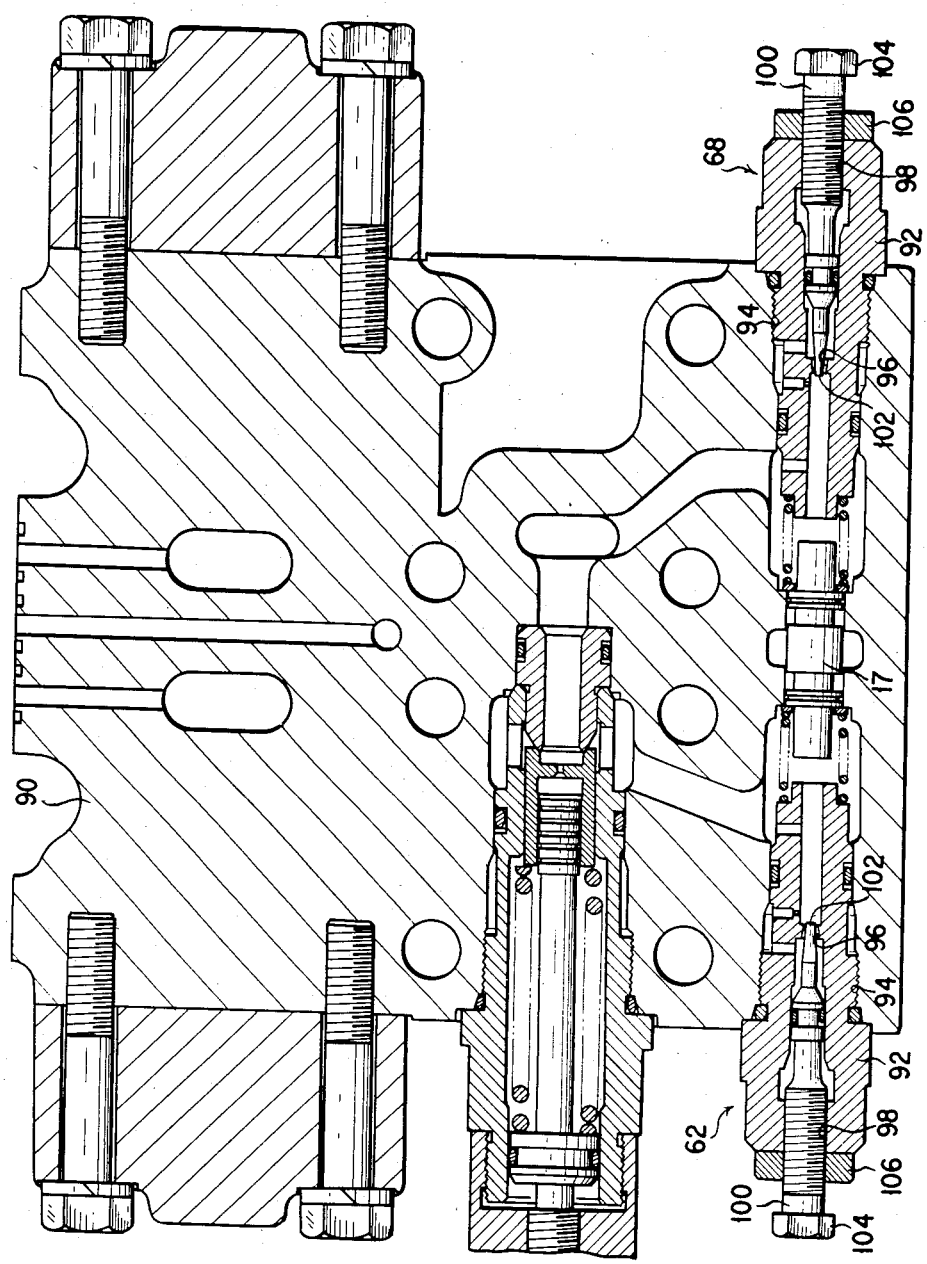

FLUID CIRCUIT FOR OPERATING A BIDIRECTIONAL HYDRAULIC MOTOR WITH A REDUCED SHOCK

BACKGROUND OF THE INVENTION

Our invention concerns a fluid circuit for driving a bidirectional hydraulic motor used, for example, for propelling an earthmover or for actuating a revolving unit thereon. Our invention is directed more specifically to improved means in such a hydraulic circuit for the reduction of shocks arising as when the motor is set into or out of rotation.

The hydraulic motor drive circuit of the class under consideration has generally been equipped with a brake valve arrangement. It comprises a counterbalance valve interposed between the motor and a directional control valve operated manually for selectively placing the pair of inlet/outlet ports of the motor in communication with a pump and a fluid drain, and two safety valves connected in opposite directions between the pair of main fluid lines extending between motor and counterbalance valve. A problem with this type of motor drive circuit has been the production of shocks when the manual control valve is manipulated to set the motor into or out of operation. Shocks have also tended to occur at the end of the acceleration, or at the start of the deceleration, of the motor. These shocks are due to an abrupt pressure rise, caused by the inertial force of the load on the motor, taking place in the driving fluid line at the time of a start up and in the braking fluid line at the end of acceleration, at the start of deceleration, and at the time of a stop.

A solution to the above problem has been suggested by Japanese Utility Model Application No. 57-29614 and corresponding U.S. patent application Ser. No. 471,341, the latter having been filed by Sato et al. on Mar. 2, 1983 and assigned to the assignee of the instant application. That prior application proposes the use of two dual pressure relief valves connected in opposite directions between the pair of main lines extending between manual control valve and motor. Each dual pressure relief valve is closed upon pilot actuation by a timing valve responsive to a pressure differential between the main lines, so that the pressure rise in either of the main lines takes place in two discrete steps. The stepwise pressure rise can appreciably alleviate the resulting shock exerted on the vehicle.

We have found the above solution unsatisfactory, however. The timing valve must pilot actuate either of the relief valves with some delay for temporarily holding each pressure rise at the first or lower one of the two steps. The noted prior application employed to that end a fixed orifice between each of the opposite pilot ports of the timing valve and the associated one of the main fluid lines. We object to the use of the fixed orifices because the length of time during which the fluid pressure is kept at the first of the two successive pressure rises is predetermined by the orifice diameter. Should the fixed orifice diameter be too small, the circuit would become poor in response, demanding a prolonged period of time for braking or accelerating. It has also been found that when the vehicle is steered, the revolving unit thereof would undergo some angular displacement. Should the orifice diameter be too large, on the other hand, then the desired shock reducing effect would lessen.

The above inconveniences arising from the use of the fixed orifices become all the more pronounced in the case of an excavator, which finds a great variety of applications demanding its operation in an as much diversity of ways. Any fixed orifice diameter may suit one mode of operation but will run counter to another. For instance, if the vehicle is put to a duty that requires much steering, the orifice diameter may be so determined as to minimize the undesired angular displacement of the revolving unit at the sacrifice of shock reduction. In another duty, however, the orifice diameter setting may rather be such that shocks are reduced to a minimum even if there is some displacement of the revolving unit.

SUMMARY OF THE INVENTION

We have hereby overcome the noted inconveniences caused by the prior art hydraulic motor drive circuit of the type defined and make it possible to adjustably vary the period of time during which the fluid pressure is maintained at the first of the two successive step as it rises as when the motor is set into or out of rotation, so that the pressure rise characteristic of the circuit may be readily varied as required to suit the particular duty conditions of the machine incorporating the circuit.

Stated briefly, the hydraulic motor drive circuit of our invention employs a pair of variable restrictors in substitution for the conventional fixed restrictors. Each variable restrictor is constructed so as to allow ready adjustment of the flow rate therethrough. The circuit may be conditioned for desired performance characteristics by simple manipulation of the variable restrictors.

The above and other features and advantages of our invention and the manner of realizing them will become more apparent, and the invention itself will best be understood, from a study of the following description and appended claims, with reference had to the attached drawings showing a preferred embodiment of the invention.

BRIEF DESCRIPTION OF THE DRAWINGS

FIG. 2 is a sectional detail view of a valve assembly in the circuit of FIG. 1, showing in particular the pair of variable restrictors constituting a feature of our invention.

DESCRIPTION OF THE PREFERRED EMBODIMENT

Figure 1:
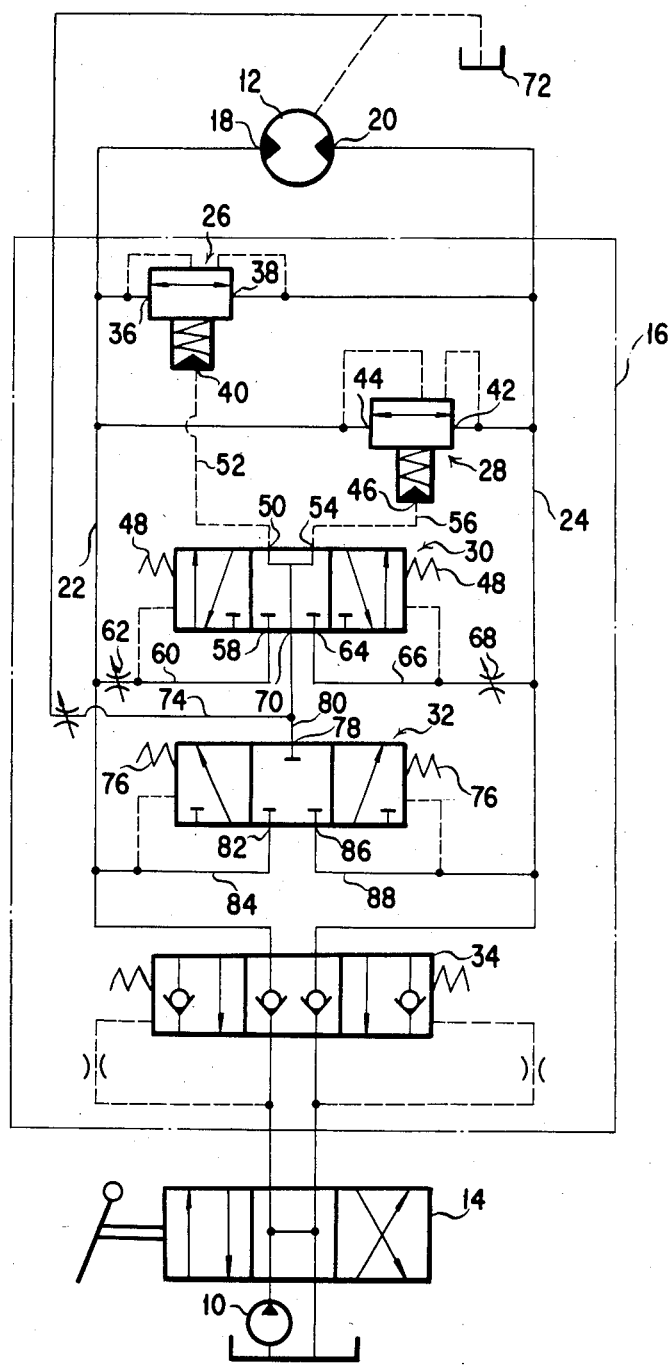
FIG. 1 is a schematic representation of the hydraulic motor drive circuit constructed in accordance with the novel concepts of our invention.

The hydraulic motor drive circuit shown in FIG. 1 is largely of the type described and claimed in the aforementioned Japanese Utility Model Application No. 57-29614 and corresponding U.S. patent application Ser. No. 471,341, now U.S. Pat. No. 4,520,625, dated June 4, 1985. We will herein incorporate the contents of these prior applications only insofar as is necessary for a full understanding of the features and advantages of our invention.

At 10 in FIG. 1 there is shown a pump or like source of hydraulic fluid under pressure for driving a bidirectional hydraulic motor 12 which may be either a propelling motor of an earthmover or a swing motor for its superstructure. Interposed between pump 10 and motor 12 are a hand operated directional control valve 14 and a brake valve arrangement shown enclosed in the rectangular outline and labelled 16. The manual control valve 14 is of conventional design capable of selectively delivering the pressurized fluid from the pump 10 to the pair of opposite inlet/outlet ports 18 and 20 of the motor 12 by way of a pair of main fluid lines 22 and 24.

The brake valve arrangement 16 comprises first 26 and second 28 dual pressure relief valves, a timing valve 30, a drain control valve 32, and a counterbalance valve 34. Of these, the counterbalance valve 34 is of standard construction and operates in the well known manner, so that no further description thereof will be necessary.

Connected in parallel with each other between the pair of main lines 22 and 24, the two dual pressure relief valves 26 and 28 are of like construction except that they are oriented in opposite directions. The first relief valve 26 has a first fluid inlet/outlet port 36 in constant communication with the first main line 22, and a second inlet/outlet port 38 in constant communication with the second main line 24. Normally, that is when there is no fluid pressure received through its pilot port 40, the first relief valve 26 is conditioned to pass the pressurized fluid from first main line 22 toward second main line 24 at a predetermined relatively low pressure, and to pass the pressurized fluid from second main line 24 toward first mainline 22 at a predetermined higher pressure. The first relief valve 26 closes when pilot actuated from the timing valve 30 in a manner set forth hereafter, blocking communication between the main lines 22 and 24.

The second relief valve 28 has a first inlet/outlet port 42 in constant communication with the second main line 24, and a second inlet/outlet port 44 in constant communication with the first main line 22. When there is no pressure received through its pilot port 46 the second relief valve 28 is conditioned to pass the pressurized fluid from second main line 24 toward first main line 22 at the predetermined low pressure, and to pass the pressurized fluid from first main line 22 toward second main line 24 at the predetermined high pressure. When pilot actuated from the timing valve 30, then, the second relief valve 28 also closes to block communication between the main lines 22 and 24.

The timing valve 30 is a five way, three position valve, normally held centered under the forces of a pair of springs 48 on its opposite ends and actuated right or left in response to a pressure differential between the pair of main lines 22 and 24. The timing valve 30 has the following five ports:

1. A first inlet/outlet port 50 in communication with the pilot port 40 of the first dual pressure relief valve 26 by way of a pilot line 52.

2. A second inlet/outlet port 54 in communication with the pilot port 46 of the second dual pressure relief valve 28 by way of a pilot line 56.

3. A first inlet port 58 in communication with the first main line 22 by way of a branch line 60 having a first variable restrictor 62.

4. A second inlet port 64 in communication with the second main line 24 by way of a branch line 66 having a second variable restrictor 68.

5. A drain port 70 in communication with a fluid drain 72 by way of a drain line 74.

The two variable restrictors 62 and 68 constitute a feature of our invention. The timing valve 30 is actuated right in response to fluid pressure downstream of the first variable restrictor 62, and is actuated left in response to fluid pressure downstream of the second variable restrictor 68. The three positions of the timing valve 30 are:

1. A normal or central position for communicating the pilot ports 40 and 46 of both dual pressure relief valves 26 and 28 with the fluid drain 72 and for blocking both inlet ports 58 and 64.

2. A left hand offset position for pilot actuating the first dual pressure relief valve 26 in response to fluid pressure downstream of the first variable restrictor 62 and for holding the pilot port 46 of the second dual pressure relief valve 28 in communication with the fluid drain.

3. A right hand offset position for pilot actuating the second dual pressure relief valve 28 in response to fluid pressure downstream of the second variable restrictor 68 and for holding the pilot port 40 of the first dual pressure relief valve 26 in communication with the fluid drain.

The drain control valve 32 is a three way, three position valve, normally held centered by the counteracting forces of to a pressure differential between the pair of main lines 22 and 24. The drain control valve 32 has the following three ports:

1. A drain port 78 in communication with the fluid drain 72 by way of a drain line 80 and the aforesaid drain line 74.

2. A first inlet port 82 in communication with the first main line 22 by way of a branch line 84.

3. A second inlet port 86 in communication with the second main line 24 by way of a branch line 88.

The three positions of the drain control valve 32 are:

1. A normal or central position for blocking all the ports 78, 82 and 86.

2. A left hand offset position for blocking the first inlet port 82 and communicating the second inlet port 86 with the fluid drain.

3. A right hand offset position for communicating the first inlet port 82 with the fluid drain and blocking the second inlet port 86.

The drain control valve 32 shifts to the left hand offset position when the bidirectional motor 12 is pressurized through the first main line 22, thereby placing the second main line 24 in communication with the fluid drain 72. When the motor 12 is pressurized through the second main line 24, on the other hand, the drain control valve 32 shifts to the right hand offset position for placing the first main line 22 in communication with the fluid drain.

Preferably, the two dual pressure relief valves 26 and 28, timing valve 30, drain control valve 32, and two variable restrictors 62 and 68 may all be combined into a single valve assembly having a common housing. We have illustrated in FIG. 2 a section through such a combined valve assembly, revealing in particular the variable restrictors 62 and 68 forming the gist of our invention. The reference numeral 90 in this figure denotes the valve housing shared by the relief valves 26 and 28, timing valve 30, and drain control valve 32. The two variable restrictors 62 and 68 can be identical in construction, each having a valve body 92 threadedly engaged in a bore 94 in the valve housing 90 and defining an orifice 96. The valve body 92 has a tapped bore 98 for receiving a threaded adjusting stem 100 having a conical tip 102 received with clearance in the orifice 96. The adjusting stem 100 has a hexagon head 104 on its end, away from the conical tip 102, projecting out of the tapped bore 98 for ready access. A locknut 106 normally firmly retains the adjusting stem 100 in a desired axial position with respect to the valve body 92.

Thus, for changing the pressure drop offered by each variable restrictor 62, 68, the locknut 106 may be loosened, and the adjusting stem 100 may be screwed in a directional either into or out of the bore 98 by turning its hexagon head 104 with a matching tool to vary the gap between its conical tip 102 and the orifice 96.

Reference is directed to the aforesaid U.S. patent application Ser. No. 471,341 for further constructional details of the dual pressure relief valves 26 and 28, timing valve 30, and drain control valve 32.

Operation

The directional control valve 14 is to be hand operated in the usual manner for setting the bidirectional motor 12 into and out of rotation in either of the opposite directions. Let it be assumed that this valve has now been manipulated to deliver the fluid under pressure to the pump 12 by way of the first main line 22. Then the drain control valve 32 will shift to its left hand offset position thereby placing the second main line 24 in communication with the fluid drain via the ports 86 and 78. Thereupon the motor 12 will start rotation in a predetermined direction.

The high starting torque of the motor 12 will cause a further increase in the fluid pressure of the first main line 22. Both first 26 and second 28 dual pressure relief valves are not yet pilot actuated from the timing valve 30. Consequently, when the fluid pressure in the first main line 24 reaches the predetermined low relief pressure of the first relief valve 26, this valve will start passing the pressurized fluid from first main line 22 toward second main line 24 and temporarily holds the first main line at the predetermined low pressure.

The pressurized fluid of the first main line 22 will also flow through the first variable restrictor 62 toward the timing valve 30. When the fluid pressure downstream of the first variable restrictor 62 rises to a predetermined degree, the timing valve 30 will travel to its left hand offset position thereby delivering the pressurized fluid that has passed the first variable restrictor from the first main line 22 toward the pilot port 40 of the first relief valve 26. Thus pilot actuated, the first relief valve 26 will block communication between first 22 and second 24 main lines. Thereupon the fluid pressure of the first main line 22 will rise again until it reaches the predetermined high relief pressure of the second relief valve 28. This second relief valve will then start passing the pressurized fluid from the first main line 22 toward the second main line 24 at the predetermined high pressure.

Thus, when the motor 12 is set into rotation by pressurized fluid delivered through the first main line 22, the fluid pressure of this main line rises in two steps, with the consequent reduction of the shock on the vehicle.

It will be appreciated that the period of time during which the fluid pressure of the main line 22 is held at the first of the two successive steps is readily variable by the first variable restrictor 62 to suit the particular duty to which the vehicle is assigned. As has been stated in connection with FIG. 2, the adjusting stem 100 may be turned in a direction into or out of the valve body 92 for adjustably varying the pressure drop across the orifice 96.

The motor 12 can be set out of rotation as the delivery of the pressurized fluid through the first main line 22 is terminated by the manipulation of the control valve 14. At this time, however, the pumping action of the motor 12 due to the inertial force of the load thereon will cause a pressure rise in the second main line 24. Then the second relief valve 28, not yet pilot actuated by the timing valve 30, will first pass the pressurized fluid from the second main line 24 toward the first main line 22 at the predetermined low pressure. As the timing valve 30 subsequently shifts to its right hand offset position owing to the pressurized fluid that has flowed through the second variable restrictor 68, the second relief valve 28 will be thereby pilot operated to close. Then the first relief valve 26 will start passing the pressurized fluid from the second main line 24 toward the first main line 22 at the predetermined high pressure. Thereafter the fluid pressure of the second main line 24 will drop.

It is thus seen that the pressure rise of the second main line 24 when the motor 12 is set out of rotation can also be divided into two steps for the reduction of the consequent shock on the vehicle. In this case, too, the period of time during which the fluid pressure is held at the lower of the two steps may be adjustably varied by the second variable restrictor 68.

Although we have described the operation of the illustrated motor drive circuit only when the bidirectional motor is set into and out of rotation in one direction, it is self evident that the circuit operates similarly when the motor is set into and out of rotation in the other direction. Various modifications of the representative embodiment disclosed herein will readily occur to one skilled in the art without departing from the scope of our invention.

We claim:

1. In a hydraulic circuit for operating a bidirectional hydraulic motor from a source of hydraulic fluid under pressure via a hand operated directional control valve, the hydraulic circuit including a first dual pressure relief valve connected between first and second main lines connecting the directional control valve to a pair of opposite fluid inlet/outlet ports of the bidirectional hydraulic motor, the first relief valve being normally conditioned to pass at a predetermined relatively low pressure the pressurized fluid from the first main line toward the second main line and to pass at a predetermined higher pressure then pressurized fluid from the second main line toward the first main line, the first relief valve being closed on pilot actuation to block communication between the first and second main lines, a second dual pressure relief valve also connected between the first and second main lines and normally conditioned to pass at the predetermined higher pressure the pressurized fluid from the first main line toward the second main line and to pass at the predetermined low pressure the pressurized fluid from the second main line toward the first main line, the second relief valve being closed on pilot actuation to block communication between the first and second main lines, and a timing valve responsive to a pressure differential between the first and second main lines for pilot actuating which ever of the first and second relief valves has been passing at the predetermined low pressure the pressurized fluid from that one of the main lines which as a higher pressure, the improvement comprising a pair of variable restrictors connected one between each main line and the timing valve for introducing a variable degree of delay in the pilot actuation and consequent closure of either of the first and second relief valves by the timing valve in response to the pressure differential between the first and second main lines, each of said variable restrictors being adjustable by means of a readily accessible adjusting member, whereby either of the main lines having a higher pressure can be held at the predetermined low pressure for a variable length of time.

* * * * *